Patented May 15, 1923.

1,455,486

UNITED STATES PATENT OFFICE.

HEINRICH GRÜNHAGEN, OF BERLIN-KARLSHORST, GERMANY, ASSIGNOR, BY MESNE ASSIGNMENTS, TO THE CHEMICAL FOUNDATION, INC., A CORPORATION OF DELAWARE.

DYES OF THE ACRIDINE SERIES AND THEIR MANUFACTURE.

No Drawing. Application filed July 29, 1916, Serial No. 112,130. Renewed September 10, 1920. Serial No. 409,494.

*To all whom it may concern:*

Be it known that I, HEINRICH GRÜNHAGEN, a citizen of the Empire of Germany, residing at Berlin-Karlshorst, Germany, my P. O. address being Prinz Joachimstr. 13, Berlin-Karlshorst, Germany, have invented certain new and useful Improvements in New Dyes of the Acridine Series and Their Manufacture, of which the following is a specification.

According to patent literature dyes of the acridine series may be obtained by heating formyl derivatives of aromatic meta-diamines, in the presence of ammonium salts or of salts of amino-bases, with unsubstituted meta-diamines or with alkylated meta-diamines. The dyes thus obtained produce only dull yellow-brown tints. They are weak products and the yield is very unsatisfactory. Moreover with this process the very difficultly soluble "acridine-yellow" is formed to a great extent.

I have found that the formation of dyes of the acridine series occurs in a very smooth reaction, with an excellent yield and without any formation of insoluble by-products or dyes if mono-or diformyl derivatives of meta-diamines of the benzene-series are heated together with a salt of a N-alkylated meta-diamine, either N-mono-alkylated or unsymmetrically N-dialkylated, of the benzene series. In order to illustrate my improved process the following equation is given as a typical example, making use of a formyl derivative of a meta-diamine of the benzene series, which is neither C-alkylated nor N-alkylated and which is not otherwise substituted in the benzene nucleus:

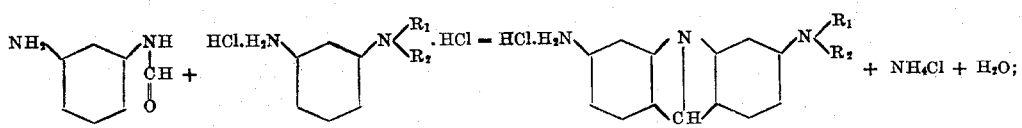

in this equation $R_1$ means H or an alkyl group; $R_2$ means an alkyl group.

The new dyes as obtained by my new and improved process are pure products, dyeing leather clear and deep tints varying from yellow to orange red. They possess excellent dyeing qualities. The dyes are not precipitated from the dye-bath if calcium salts are present, such as calcium carbonate, calcium acetate, etc., whereas most of the acridine dyes are precipitated under these circumstances. Furthermore my new products give level dyeings and the tints do not change when the leather undergoes the so-called staking operation.

As indicative of the characteristic general graphic formula of the new dyes the following is given:

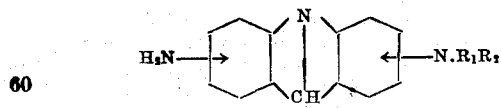

$R_1$ and $R_2$ signifying univalent substituents, such as H or an alkyl group.

However if alkyl groups are present in the benzene nuclei the general graphic formula is as follows:

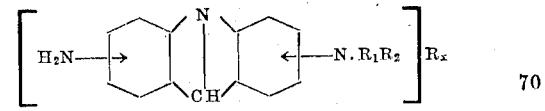

in which $R_x$ means an alkyl group, whereas $R_1$ and $R_2$ have the same meaning as above. Two specific formulæ may be given as follows:

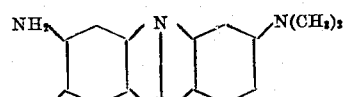

and

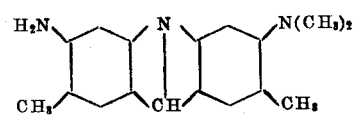

the former being obtained for example by heating formyl-meta-toluylenediamine with meta-aminodimethylaniline hydrochloride and the latter by heating for example diformyl-meta-toluylenediamine with 4-amino-2-dimethylaminotoluol-hydrochloride.

The following examples will serve as illustrative embodiments of my invention, the parts being by weight:

1. 15 parts of 4-formylamino-2-amino-1-methylbenzol and 21 parts of 3-aminodimethylaniline-hydrochloride are melted on an oil bath in an enamelled iron vessel provided with an agitator with the addition, if desired, of a diluting agent, such as glycerine or naphthalene. The mass is gradually heated up to 185–190° C. taking care that the evolution of water, which begins at about 140° C., does not become too violent so that undesirable foaming is avoided. The reaction is finished when the evolution of water vapors has ceased; this may occur for example after about 6 hours. The melt showing a metallic lustre is then allowed to run into 400 parts of water in which it dissolves easily and completely even in the cold. The solution having been filtered the dye is precipitated by adding a solution of common salt and of zinc chloride. After having been dried and pulverized the new dye forms a brown powder which is easily soluble in water and dyes leather clear orange red tints.

2. 15 parts of 4-formylamino-2-amino-1-methylbenzol and 22.5 parts of 4-amino-2-dimethylamino-1-methylbenzol (in the form of a salt) are melted together according to the procedure given in Example 1. The new dye in the dry state when pulverized forms a yellow brown powder which dyes leather clear yellow tints.

3. 17.8 parts of diformyl-meta-toluylenediamine are melted with 21 parts of 3-aminodimethylaniline-hydrochloride; under the conditions of reaction stated in Example 1. The dye thus obtained resembles very much that obtained according to Example 1. It produces also clear orange red tints on leather.

4. A melt prepared from 15 parts of 4-formylamino-2-amino-1-methylbenzol and 21 parts of a salt of 4-amino-2-methylamino-1-methylbenzol under the conditions of reaction given in Example 1, yields a new dye forming in the dry state when pulverized a red brown powder which dyes leather clear and deep pure yellow tints.

5. 13.6 parts of monoformyl-meta-phenylenediamine melted with 22.3 parts of 4-amino-2-ethylamino-1-methylbenzol-hydrochloride in the manner given in Example 1 gives a new dye forming in the dry state and pulverized a dark brown powder dyeing leather yellow brown tints.

6. 16.4 parts of diformyl-metaphenylenediamine are melted with 22.3 parts of 4-amino-2-ethylamino-1-methylbenzol-hydrochloride in the manner already cited. The formation of the dye begins at about 120° C. The dye-stuff obtained resembles very much the dye obtained according to Example 5, and its aqueous solution dyes leather somewhat clearer and more reddish tints.

I wish to state expressly that the scope of my present invention is not limited to the forgoing examples or to the special conditions of reaction given therein. As such special conditions I name more especially the temperature of reaction and the time of heating. Furthermore, for example, instead of 4-amino-2-methylamino-1-methylbenzol the corresponding diethylamino-compound may be used; also other salts than the hydrochlorides may be employed, for example sulfates.

Having now described my invention what I claim is,—

1. As new articles of manufacture, new dyes of the acridine series corresponding to the general graphic formula:

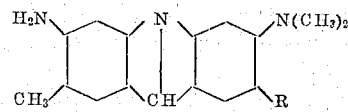

in which formula R indicates a univalent alkyl radical.

2. As a new article of manufacture a new dye of the acridine series corresponding to the graphic formula:

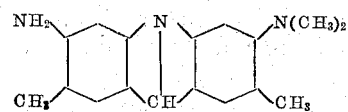

dyeing leather clear yellow tints, and which dye in the dry state and pulverized forms a yellow-brown powder readily soluble in water.

3. As a new process for manufacturing dyes of the acridine series the process which consists in heating a formyl derivative of a meta-diamine of the benzene series with a salt of a N-alkylated meta-diamine of the benzene series.

4. As a new process for manufacturing dyes of the acridine series the process which consists in heating a formyl derivative of a C-alkylated meta-diamine of the benzene series with a salt of a N-alkylated meta-diamine of the benzene series.

5. As a new process for manufacturing dyes of the acridine series the process which consists in heating a formyl derivative of a C-alkylated meta-diamine of the benzene series with a salt of a C-alkylated and N-alkylated meta-diamine of the benzene series.

6. As a new process for manufacturing dyes of the acridine series the process which consists in heating a formyl meta-toluylenediamine with a salt of a N-alkylated meta-diamine of the benzene series.

7. As a new process for manufacturing dyes of the acridine series the process which consists in heating a formyl-meta-toluylene-diamine with a salt of a C-alkylated and N-alkylated meta-diamine of the benzene series.

8. As a new process for manufacturing dyes of the acridine series the process which consists in heating formyl-meta-toluylene-diamine with the hydrochloride of 4-amino-2-dimethylaminotoluol.

In testimony whereof I have affixed my signature in present of two witnesses.

HEINRICH GRÜNHAGEN.

Witnesses:
 HENRY HASPER,
 ALLEN F. JENNINGS.